US012674747B2

(12) United States Patent
Maclellan et al.

(10) Patent No.: US 12,674,747 B2
(45) Date of Patent: Jul. 7, 2026

(54) METHOD AND SYSTEM FOR DESIGN OF PHOTONICS SYSTEMS

(71) Applicant: INSTITUT NATIONAL DE LA RECHERCHE SCIENTIFIQUE, Québec (CA)

(72) Inventors: Benjamin Maclellan, Stirling (CA); Piotr Roztocki, Longueuil (CA); James Van Howe, Davenport, IA (US); Luis Romero Cortés, Huelva (ES); Bennet Fischer, Montréal (CA); Yoann Jestin, Montréal (CA); José Azaña, Montréal (CA); Roberto Morandotti, Montreal (CA)

(73) Assignee: INSTITUT NATIONAL DE LA RECHERCHE SCIENTIFIQUE, Québec (CA)

( * ) Notice: Subject to any disclaimer, the term of this patent is extended or adjusted under 35 U.S.C. 154(b) by 705 days.

(21) Appl. No.: 17/303,705

(22) Filed: Jun. 4, 2021

(65) Prior Publication Data

US 2021/0381953 A1 Dec. 9, 2021

Related U.S. Application Data

(60) Provisional application No. 63/034,974, filed on Jun. 4, 2020.

(51) Int. Cl.
*G06N 3/044* (2023.01)
*G01N 21/25* (2006.01)
*G06N 3/006* (2023.01)
*G06N 3/126* (2023.01)

(52) U.S. Cl.
CPC ............. *G01N 21/25* (2013.01); *G06N 3/126* (2013.01)

(58) Field of Classification Search
CPC .............................. G01N 21/25; G06N 3/126
See application file for complete search history.

(56) References Cited

U.S. PATENT DOCUMENTS

| | | | |
|---|---|---|---|
| 6,526,556 | B1 | 2/2003 | Stoica et al. |
| 6,626,556 | B2 | 9/2003 | Galli |

(Continued)

FOREIGN PATENT DOCUMENTS

| | | |
|---|---|---|
| CA | 2573813 A1 | 2/2006 |

OTHER PUBLICATIONS

Jafar-Zanjani, S., Inampudi, S., & Mosallaei, H. (2018). Adaptive Genetic Algorithm for Optical Metasurfaces Design. Scientific Reports, 8(1). https://doi.org/10.1038/s41598-018-29275-z.

(Continued)

*Primary Examiner* — Brandon S Cole
(74) *Attorney, Agent, or Firm* — Gwendoline Bruneau; Lavery, de Billy, L.L.P.

(57) ABSTRACT

A system for designing a photonics system, comprising a topology optimization module and a component parameter optimization module; wherein the topology optimization module searches candidate photonics systems through photonics combinations of component; and the component parameter optimization module searches for component parameters of the candidate photonics systems to simulate successive candidate photonics systems in a desired degree-of-freedom according to a target characteristic of the photonics system. The method comprises searching through different photonics combinations of components and component parameters and selecting candidate photonics systems, and searching component parameters of the candidate photonics systems in a desired degree-of-freedom according to a target characteristic of the photonics system.

13 Claims, 8 Drawing Sheets

(56) References Cited

U.S. PATENT DOCUMENTS

| 7,516,423 | B2 | 4/2009 | De Smedt et al. | |
|---|---|---|---|---|
| 7,860,699 | B2 | 12/2010 | Dowski, Jr. et al. | |
| 7,996,344 | B1 | 8/2011 | Goel | |
| 10,509,223 | B2* | 12/2019 | Shen | G06N 3/126 |
| 11,084,225 | B2* | 8/2021 | Pinskiy | G06V 10/764 |
| 2007/0094162 | A1* | 4/2007 | Aragones | G06N 3/126 |
| | | | | 706/13 |
| 2011/0295722 | A1* | 12/2011 | Reisman | G06Q 30/0641 |
| | | | | 705/26.1 |
| 2015/0058813 | A1* | 2/2015 | Kim | G06F 30/39 |
| | | | | 716/52 |
| 2017/0248831 | A1* | 8/2017 | Rodriguez | G02F 1/353 |
| 2018/0045953 | A1* | 2/2018 | Fan | G02B 1/002 |
| 2018/0137213 | A1 | 5/2018 | Benjamin et al. | |
| 2018/0276555 | A1* | 9/2018 | Weichenberger | G06N 10/60 |
| 2018/0349531 | A1 | 12/2018 | Morris et al. | |

OTHER PUBLICATIONS

Molesky, S., Lin, Z., Piggott, A. Y., Jin, W., Vuckovic, J., & Rodriguez, A. W. (2018). Inverse design in nanophotonics. Nature Photonics, 12(11), 659-670. doi: 10.1038/s41566-018-0246-9.

Krenn, M., Malik, M., Fickler, R., Lapkiewicz, R., & Zeilinger, A. (2016). Automated Search for new Quantum Experiments. Physical Review Letters, 116(9), 1-5. https://doi.org/10.1103/PhysRevLett.116.090405.

Stanley, K. O, Miikkulainen, R. (2002). Evolving neural networks through augmenting topologies. Evolutionary Computation, 10(2), 99-127.

Rashidinejad, A., Li, Y., & Weiner, A. M. (2016). Recent Advances in Programmable Photonic-Assisted Ultrabroadband Radio-Frequency Arbitrary Waveform Generation. IEEE Journal of Quantum Electronics, 52(1), 1-17. https://doi.org/10.1109/jqe.2015.2506987.

Nikodem, M., & Wysocki, G. (2012). Chirped laser dispersion spectroscopy for remote open-path tracegas sensing. Sensors (Basel, Switzerland), 12(12), 16466-16481. doi:10.3390/s121216466.

Lukens, J.M, Lougovski, P., (2017). Frequency-encoded photonic qubits for scalable quantum information processing. Optica 4, 8-16. https://doi.org/10.1364/OPTICA.4.000008.

Haddow, P.C. & Tyrrell, A.M. (2011). Challenges of evolvable hardware: past, present and the path to a promising future. Genet Program Evolvable Mach 12: 183. https://doi.org/10.1007/s10710-011-9141-6.

\* cited by examiner

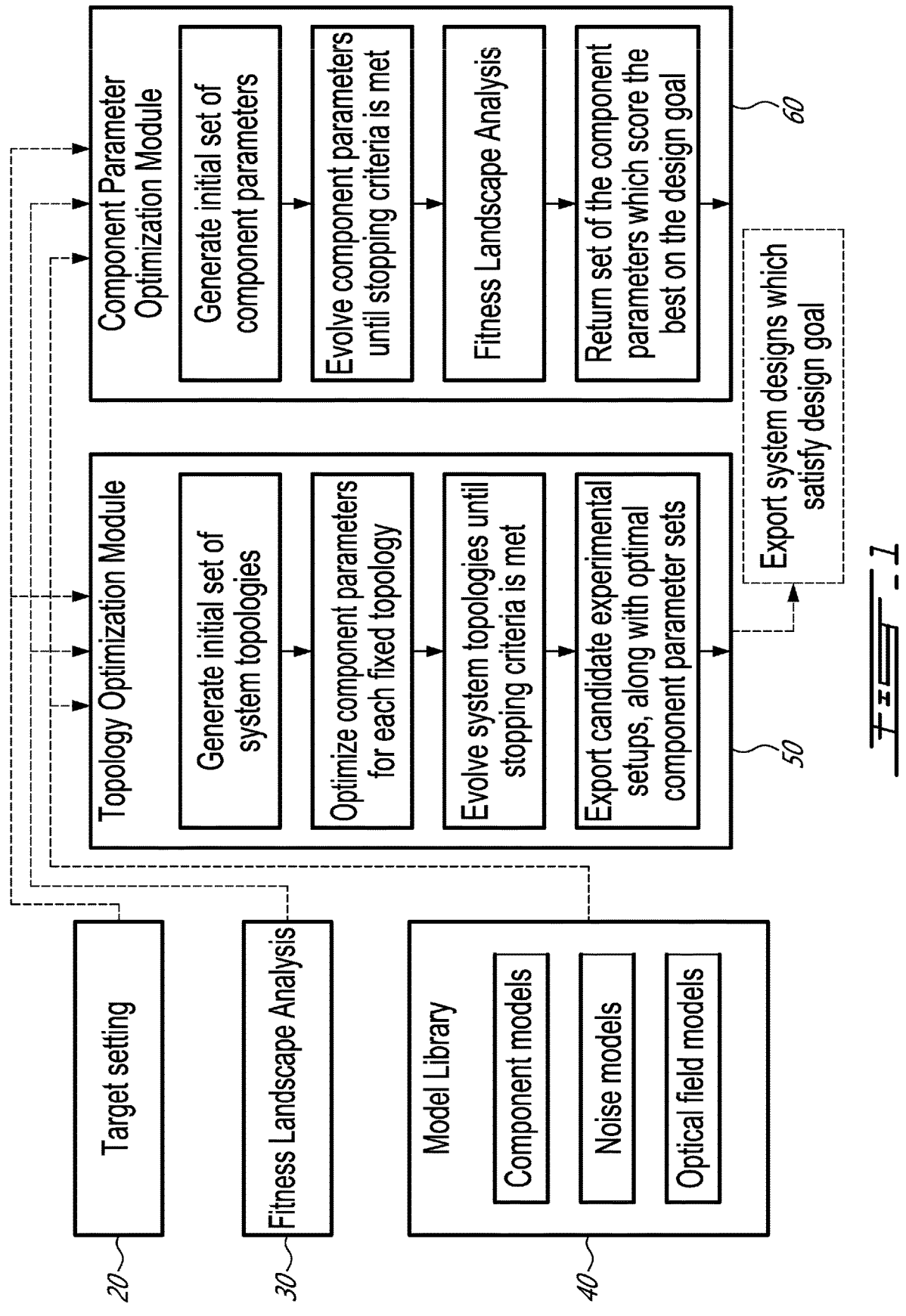

Component Parameter Optimization Module

Generate initial set of component parameters

Evolve component parameters until stopping criteria is met

Fitness Landscape Analysis

Return set of the component parameters which score the best on the design goal

60

Topology Optimization Module

Generate initial set of system topologies

Optimize component parameters for each fixed topology

Evolve system topologies until stopping criteria is met

Export candidate experimental setups, along with optimal component parameter sets

50

Export system designs which satisfy design goal

Target setting

20

Fitness Landscape Analysis

30

Model Library

Component models

Noise models

Optical field models

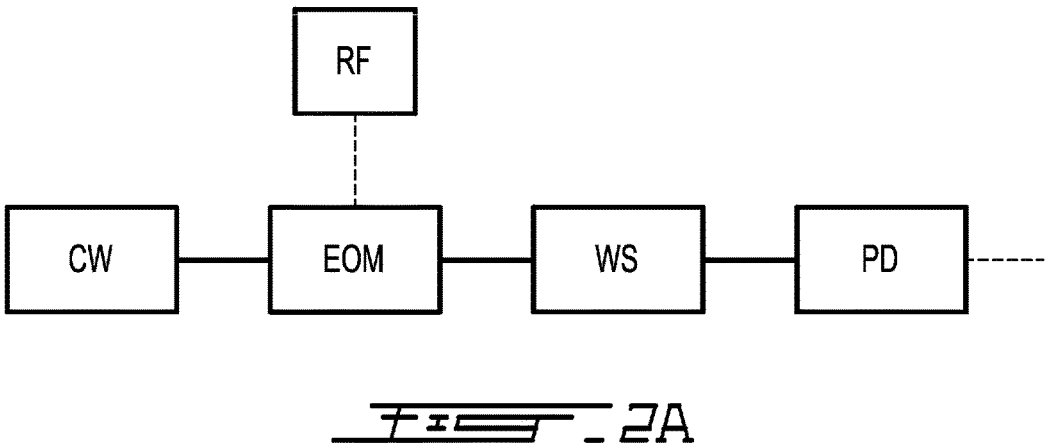
_FIG. 2A_
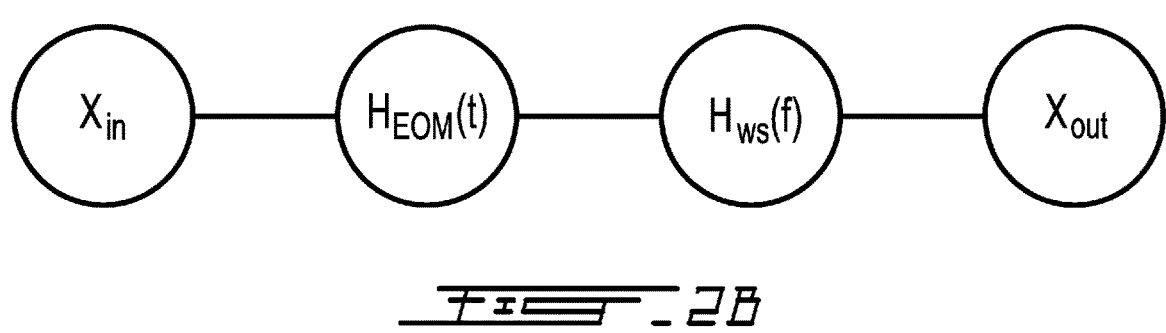
_FIG. 2B_
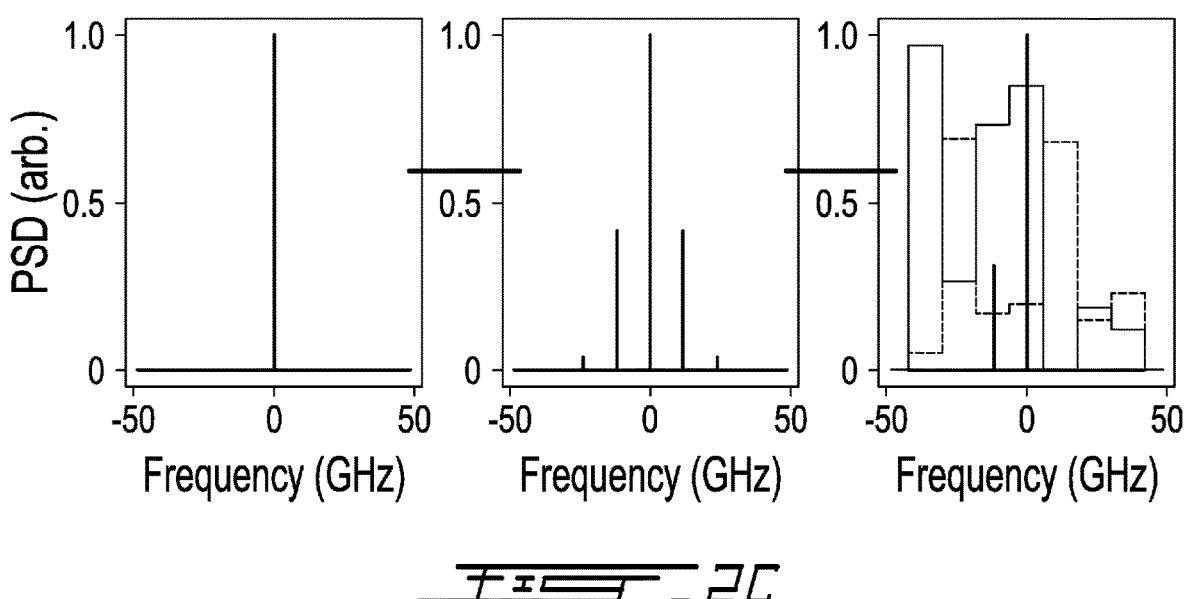
_FIG. 2C_

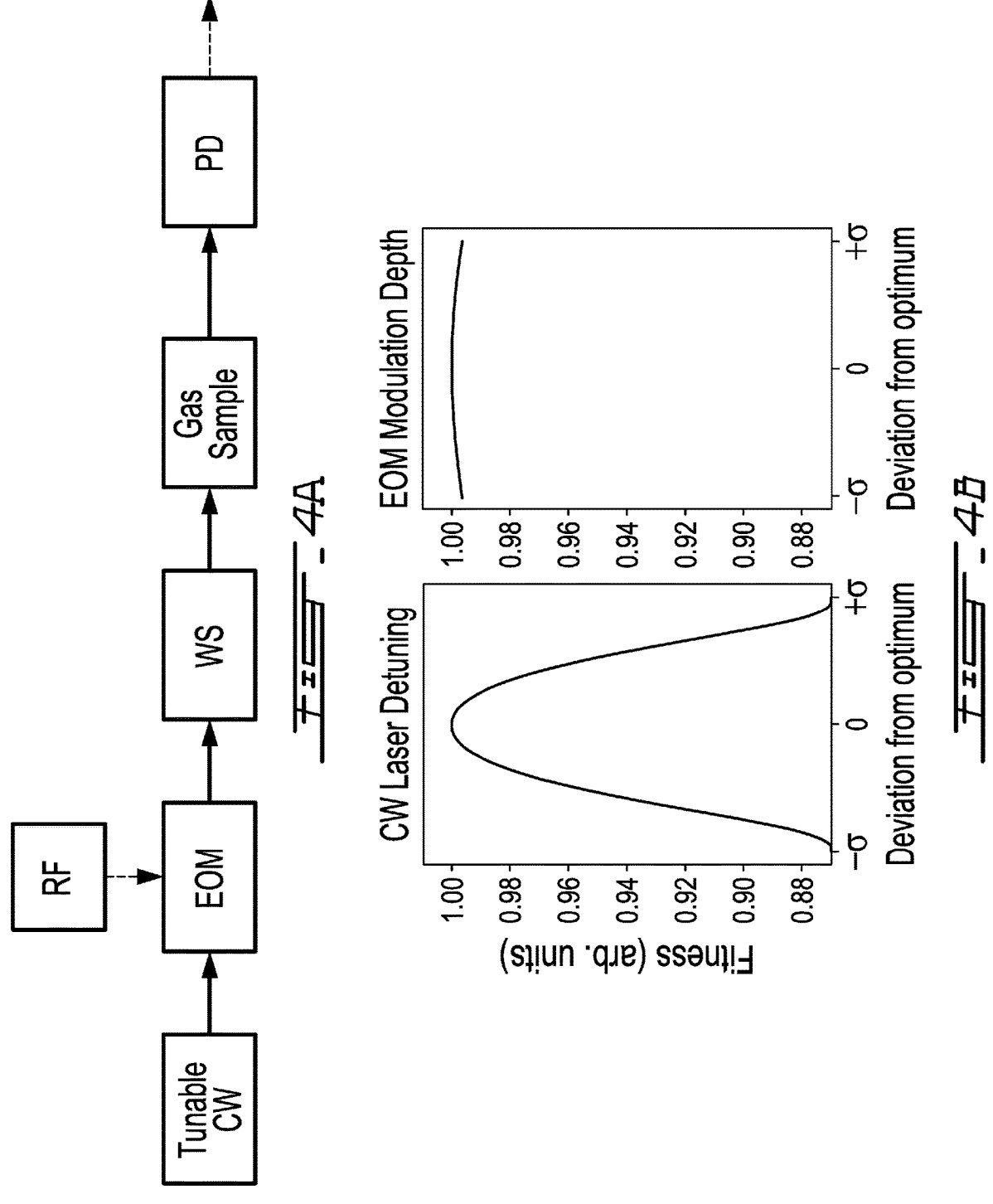

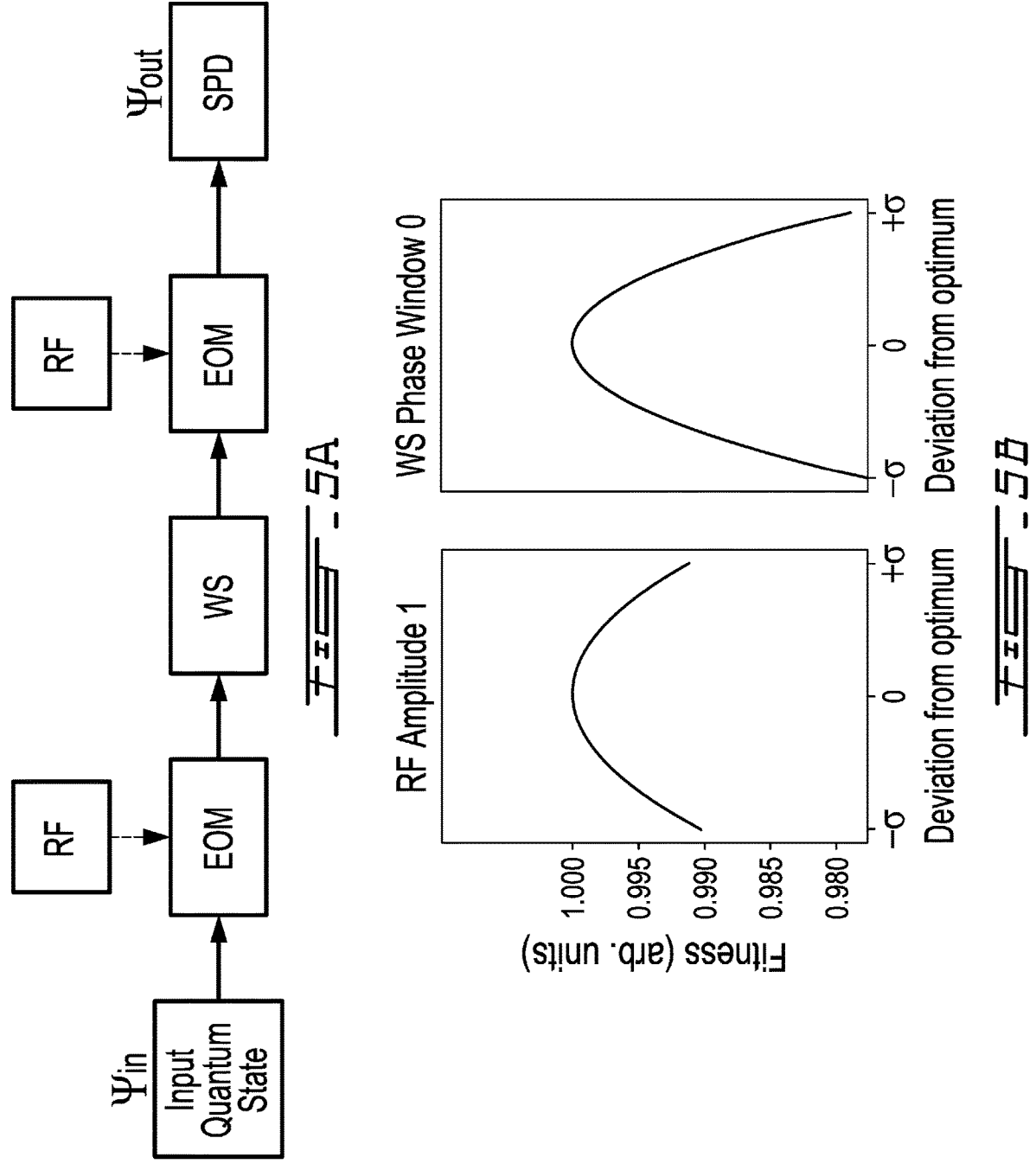
$\Psi_{in}$
$\Psi_{out}$
$\mathit{Fig}$ - $5A$
$\mathit{Fig}$ - $5B$

METHOD AND SYSTEM FOR DESIGN OF PHOTONICS SYSTEMS

CROSS REFERENCE TO RELATED APPLICATIONS

This application claims benefit of U.S. provisional application Ser. No. 63/034,974, filed on Jun. 4, 2020. All documents above are incorporated herein in their entirety by reference.

FIELD OF THE INVENTION

The present invention relates to photonics systems. More specifically, the present disclosure is concerned with a method and a system for the design of photonics systems.

BACKGROUND OF THE INVENTION

Optical technologies find applications in a range of fields including, for example, metrology, material processing, and telecommunications; photonics also shows promising avenues for information processing, neuromorphic computing, and quantum technologies. Photonics systems used in such applications require the consideration of a large number of parameters, including optical source parameters, topology of the systems, including which optical and electro-optic components are used, how they are connected and the operational parameters of each component, with all components being interdependent with respect to the output of the systems. The realization-specific concerns, such as operational stability, ease of fabrication and/or setup, and realization costs are also to be considered. Designing and manufacturing devices, systems and integrated circuits combining sources and detectors with other means of manipulating light for use in a very wide range of applications, in such large parameter spaces with a plurality of component types, may be complex and time-consuming, which limits the rate and breadth of optical technology development. Optimizing photonic chip designs is another application of increasing importance as optical technologies are increasingly produced in integrated platforms.

Photonics system design remains highly-specialized and complex and typically relies on researchers' and trained experts' intuition and iterative simulations, past experience, and a body of literature regarding various photonics systems. Simulation tools are also used to perform in silico studies of system designs, and allow simulations performed for given experimental topologies, given optical source characteristics, and given component parameters, thus restricting the range of optical system designs considered.

Optimization methods gradient-based methods and non-gradient-based methods, such as evolutionary algorithms for example, have been used to search the component parameter space of fixed system topologies. Such search methods use operational component parameters targeted for improving performance towards a predetermined desired performance in a buildable package for example, the central wavelength, the bandwidth of a filter, or the driving power or frequency of a radiofrequency signal driver. However, such methods have been confined to the optimization of a single, fixed system topology, with a specific order and choice of optical components, without exploring other, potentially better suited and unintuitive topologies. Inverse design has recently been applied with success in the field of nanophotonics and was capable of designing novel components with improved functionality. However, inverse design has so far focused only on individual optical component design, such as gratings, couplers, microcavities, mirrors, etc., rather than functionality at a system level.

As another example, a simple algorithm was used to randomly search through optical setups to identify a system producing high-dimensional GHz quantum state in the orbital-angular momentum degree-of-freedom. However, only optical components with fixed parameters and a fixed interaction with the photons were considered, and a random search was used.

Thus still limited in scope, as they only explore at most parts of the parameter space, current state-of-the-art methods for designing photonics systems ignore potentially better systems and solutions for a target at stake, and are remain time consuming due to manual iterative processes.

Indeed, system design still relies on highly-trained specialists. With complex design targets, involving a number of components and parameters, system design is increasingly challenging and an intuitive understanding regarding how components might interact may become unmanageably difficult. For example, in ultrafast optical systems, a chain of components manipulate optical fields in the temporal domain, the frequency domain, or both simultaneously, and the total transformation on an optical field is the result of a concatenation of multiple Fourier transforms, spectral/time-domain derivatives and other operations. These are difficult to conceptualize, let alone intuitively design, even for highly-trained specialists.

Design optimization methods and simulations in photonics, besides being highly limited so far, are currently also highly domain-specific, and need to be redeveloped for each new application. This increases development times and limits the robustness of existing design methods.

Finally, the actual fabrication of photonics systems always requires corrections related to the system design nonidealities, such as for example environmental noise, manufacturing imperfections, and/or inaccuracies in the system designs. Thus, transition from the system designs to buildable system, in real-world, noisy implementations, still remains a challenge.

There is still a need in the art for a method and a system for design of photonics systems.

SUMMARY OF THE INVENTION

More specifically, in accordance with the present invention, there is provided a system for designing a photonics system, comprising a topology optimization module and a component parameter optimization module, wherein the topology optimization module searches candidate photonics systems through photonics combinations of components and the component parameter optimization module searches for component parameters of the candidate photonics systems to simulate successive candidate photonics systems in a desired degree-of-freedom according to a target characteristic of the photonics system.

There is provided a method for designing a photonics system, comprising searching through different photonics combinations of components and component parameters and selecting candidate photonics systems, and searching component parameters of the candidate photonics systems in a desired degree-of-freedom according to a target characteristic of the photonics system.

Other objects, advantages and features of the present invention will become more apparent upon reading of the following non-restrictive description of specific embodiments thereof, given by way of example only with reference to the accompanying drawings.

BRIEF DESCRIPTION OF THE DRAWINGS

In the appended drawings:

FIG. 1 illustrates embodiments of aspects of the present disclosure;

FIG. 2A is a schematical view of a candidate system design for a continuous arbitrary waveform generator;

FIG. 2B is a graph corresponding to the system of FIG. 2A according to an embodiment of an aspect of the present disclosure;

FIG. 2C shows power spectral density (PSD) analysis of the optical field in the frequency domain at intermediate steps of the system of FIG. 2A according to an embodiment of an aspect of the present disclosure;

FIG. 4A is a schematical view of candidate system design for a gas sensor design;

FIG. 4B shows a comparison of the fitness function in the local region around the optimum for continuous-wave laser detuning and electro-optic phase modulation (EOM) depth according to an embodiment of an aspect of the present disclosure;

FIG. 5A is a schematic view of a candidate system design for a frequency-bin quantum gate;

FIG. 5B shows a comparison of the fitness function in the local region around the optimum for two parameters according to an embodiment of an aspect of the present disclosure.

DESCRIPTION OF ILLUSTRATIVE EMBODIMENTS

Figure 2D:
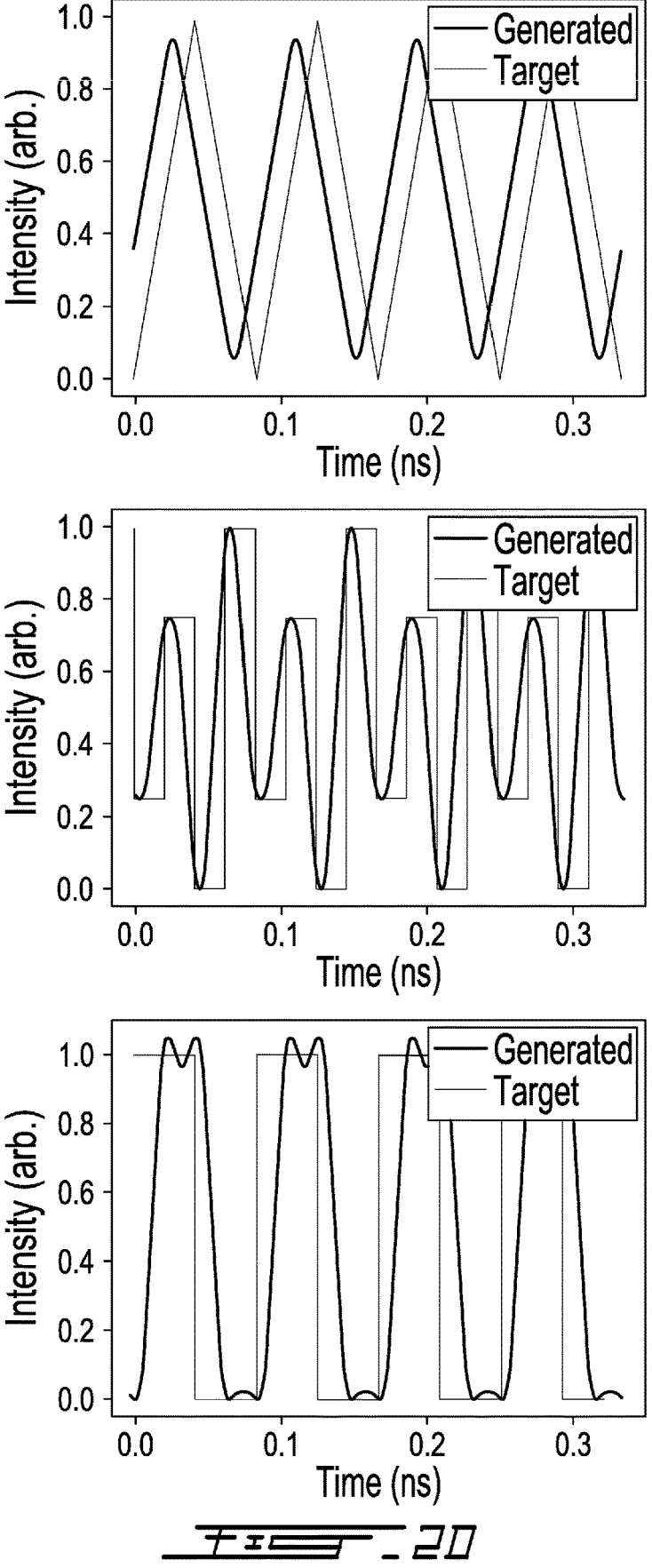
FIG. 2D shows the electronic output waveform compared to the target wave of the target system of FIG. 2A for various waveforms according to an embodiment of an aspect of the present disclosure.

The present invention is illustrated in detail by the following non-limiting examples.

According to an embodiment of an aspect of the present disclosure, the method comprises target setting (20), fitness landscape analysis (30) and use of a model library (40) (FIG. 1). A topology optimization module and a component parameter optimization module, a target setting module, a fitness analysis module and a model library module are each defined independently from the others, so that they can be modified and/or updated independently of all others. However instructions are accessible from one module to the others.

The target setting module (20) defines a fitness function according to a target functionality of a photonics system to be built. The fitness function is used to determine, for every possible solution to the targeted functionality, how 'good' it is. The fitness function takes a candidate solution as input and produces as output a fitness value representing how fit or how "good" the candidate solution is with respect to the target functionality, for quantification and comparison of the performance of different system topologies and component parameters. The fitness function definition is dependent on the target of the photonics system to be designed. Typically, the fitness function is a scalar function f(s) that maps the system parameters and topology to a real, scalar number. The fitness value may be arbitrarily selected as a positive value and maximized through iterative optimization, higher values representing better solutions, using evolutionary or gradient-based algorithms for example; in such cases, the fitness landscape typically comprises peaks, each representing an alternative solution for a candidate design with specific parameters, separated by lower-fitness regions. The fitness value may be arbitrarily selected as a negative value and then referred to as a loss function, to be minimized in view of improved fitness.

A population of initial candidate system designs for a target application is mutated into subsequent candidate photonics system designs in the desired degree-of-freedom and their component parameters modified, into subsequent candidate system designs with increased fitness, until a satisfying solution is found. More precisely, from an initial set of system fixed topologies, for each one of the initial fixed topologies, photonics combinations of components are searched in relation to a target characteristic of the photonics system to be designed, photonics components and/or component connections are added ad/or removed; and component parameters are modified to simulate successive candidate photonics system designs in the desired degree-of-freedom, until the best, or at least a satisfying depending on the application, solution photonics system in relation to a pre-determined criterium is retrieved.

The present method comprises analyzing the fitness function landscape in a parameter region selected in relation to a specific operational regime, namely a defined region of the parameter space to assess how robust a candidate system is to perturbations and nonidealities and also to guide optimization towards better system designs. Since nonidealities can be represented as perturbations in the parameter space, they also modify the fitness value and system performance.

Analysis of the fitness landscape of different system designs allows assessing the stability and robustness of the candidate systems. Second-order derivatives and Hessian matrices of the fitness function with respect to component parameters may be used to provide information about both the sensitivity of individual parameters and the correlations between parameters for example, as tools for anticipating the transition from design concepts to physical implementations of the target system. Analysis of the parameter sensitivity can be used for the topology optimization, by using information about correlations between component parameters. It may also be used to improve the method by making perturbation response part of the fitness function, which results in system designs that are robust against imperfections and noise or highly sensitive to given input perturbations. The fitness landscape analysis is used by the component parameter optimization and the topology optimization modules to guide the design method towards systems that demonstrate the desired fitness function stability.

The method comprises using libraries of optical field models, photonics component models and noise source models to simulate photonics systems in the desired degree-of-freedom. The optical field models represent the optical source under consideration, such as, for example, pulsed or continuous wave (CW) lasers, light-emitting diodes, quantum dots, and single photon sources. Photonics component models are described in the formalism of transfer functions, dependent on any free parameters of the components, such as, for example, the driving voltage of an electro-optic phase modulator or the splitting ratio of a variable beam splitter.

The set of photonics component models considered depends on the optical degrees-of-freedom. Noise models simulate the effects of environmental noise on the system fitness.

The outputs of the design target module, the fitness landscape analysis module, and the model library module are used by both the topology optimization module and the component parameter optimization module, for design optimization (60, 50).

A range of optimization methods yielding bounded component parameters, in terms of experimentally-accessible system designs, is available for component parameter optimization (60). When some components of the system have discrete rather than continuous parameters, such as for example, components that use digital settings, broadly applicable methods such as evolutionary methods, which allow both bounded discrete and bounded continuous parameters, may be used. For example, hybrid optimization methods based on evolutionary optimization in combination with a gradient-based method on the continuous variables result in accurate and efficient component parameter optimization. Gradient based algorithm methods handle large amounts of continuous variables, in a continuous setting, through interpolation. Gradient-based method optimization methods uses the gradient of the fitness function to determine the most promising directions along which to search as well as an acceptable step length from the line search, to search for a better point in the n-dimensional parameter space.

The system topology optimization module searches for optimal graph structures, in terms of components to be included in the system and how these components are connected. The topology of the photonics systems is represented as a computational graph in such a way that it is manageable by the optimization module while still representing physicality, using, for example, vertices and directed edges representing the components, such as fibers free-space, integrated waveguides, etc. for example, and optical propagation paths connecting the components. The graph topology may thus be algorithmically modified based on a selected number of input/output optical paths, and the corresponding system simulated, thereby allowing exploring new system designs.

As illustrated in FIG. 1, the topology optimization module generates an initial set of system fixed topologies, optimizes the component parameters for each one of the initial fixed topologies, evolves the topologies and exports candidate systems, with optimal component parameter sets (50), while the component parameter optimization module generates an initial set of component parameter, evolves the component parameters, and returns a set of component parameters which scores well on the design target as assessed by fitness landscape analysis by the fitness landscape analysis module (30), so as to determine system designs which satisfy a design goal.

In the above described embodiment, a combination of five modules is used to return photonic system designs that fulfill the design target, using optical component models of a model library. All modules may be programmed as sets of computer instructions, for central processing unit (CPU) or graphics processing unit (GPU) computations, at runtime, and combinations of system topologies and component parameter sets are iteratively designed, simulated and assessed until stopping criteria are met. The stopping criteria may be selected such as a given number of iterations, a given runtime, or a predetermined threshold of system design fitness for example. The fitness landscape analysis is used to tailor design systems, with a desired stability against perturbations, increasing the likelihood of successful real-world implementations by taking into account real-world performance bottlenecks, manufacturing tolerances, for example.

A prototype was developed in the Python programming language for designing systems that manipulate the time-frequency degree-of-freedom of optical fields using the method described hereinabove.

First, the method was used for designing a system for photonic-assisted arbitrary waveform generation (FIGS. 2, 3), as may be of interest in a variety of fields, including high-speed wireless telecommunications, remote sensing, and network/device characterization for example, to generate high-speed electronic waveforms. Such electronic patterns are produced by manipulations of an optical field and optical-to-electronic conversion. In the present example, the user-defined target, defining the fitness function of the method as described hereinabove in relation to FIG. 1, was a system for generating a waveform most similar to a target waveform, such as a square, sawtooth, chirped, and Gaussian pattern, for example.

FIG. 2A shows an example of a candidate system for generating 12 GHz repetition rate continuous waveforms, comprising a continuous-wave laser (CW), a radio-frequency synthesizer (RF), an electro-optic phase modulator (EOM), a wave shaper (WS), and a photo-detector (PD). FIG. 2B shows a computational graph corresponding to the system of FIG. 2A. FIG. 2C shows the optical field in the frequency domain at intermediate steps of the design of the system of FIG. 2A, the third plot from the right demonstrating the amplitude and phase filters applied by the wave shaper (WS), arbitrary unit in the y-axis. FIG. 2D shows the electronic output waveform compared to various waveform targets, the system using in each case the same topology (FIG. 2A), with different operational parameters found for each component.

Figure 3:
FIG. 3 shows the parameter sensitivity analysis for the system of FIGS. 2 according to an embodiment of an aspect of the present disclosure.

FIG. 3 shows an example of the parameter sensitivity for the system of FIG. 2, providing insight into which component parameters most influence the fitness value, and thus most contribute to successful physical implementations. The downward vertical bars in the graph represent the relative stability of the fitness value to perturbations for each parameter, indicating that the fitness is more sensitive to changes in the electro-optic phase modulator (EOM) modulation frequency.

Figure 4C:
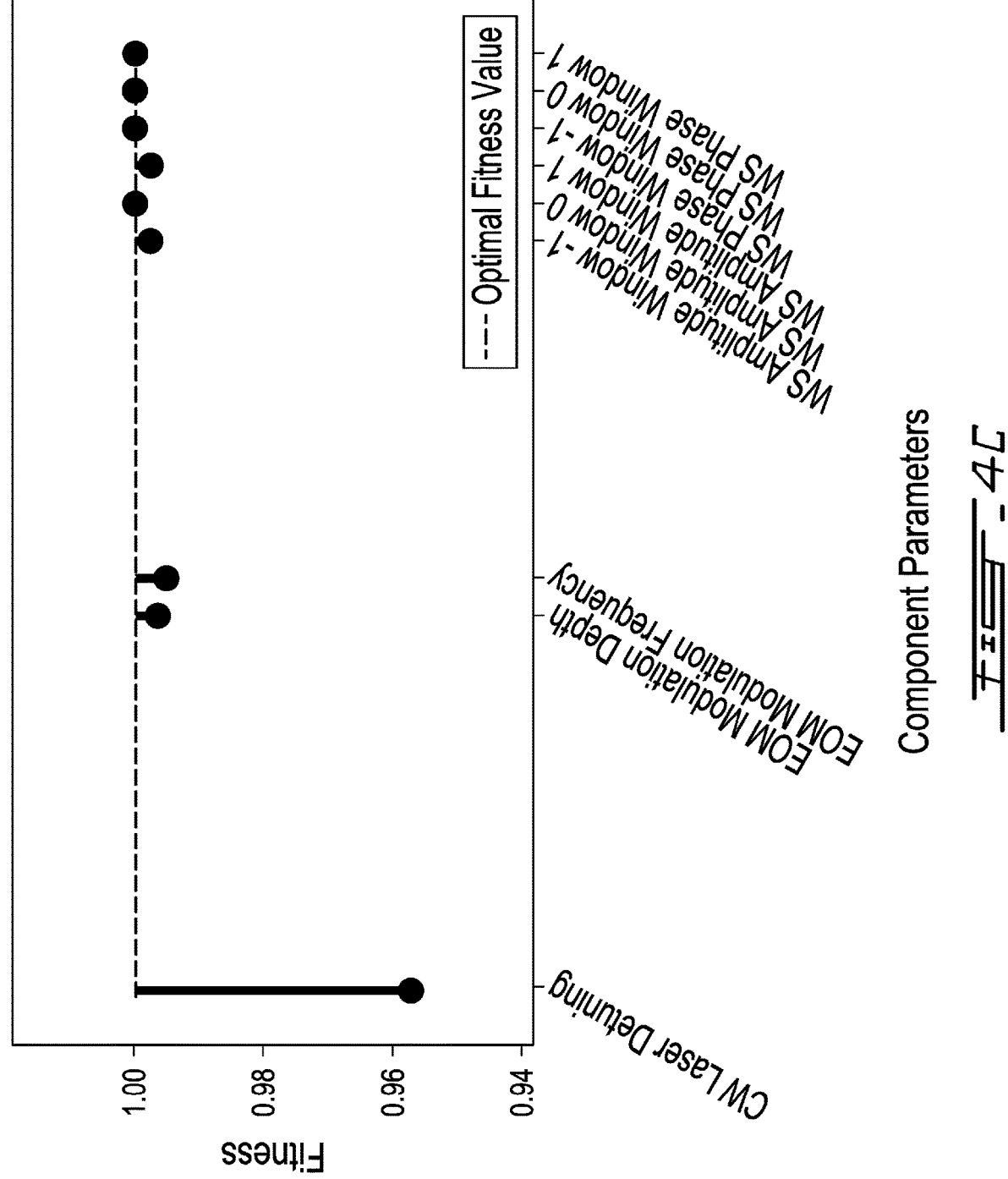
FIG. 4C shows parameter analysis according to an embodiment of an aspect of the present disclosure.

The method was tested to suggest a system usable as an optical sensor, where the fitness value is readily changed with a small perturbation in a single system parameter. In FIG. 4, a gas sensor, highly sensitive to one operational parameter, in this case the frequency of a tunable continuous-wave laser (CW), and based on frequency dependent absorption, was the target system. In the suggested system, the fitness value, in this case the optical power, of the system is found extremely sensitive to the tunable continuous-wave laser (CW) frequency detuning, which provides initial directions for developing a gas sensor and guide searches for new schemes. FIG. 4C shows the system parameter analysis of the optimal system, providing insight into which parameters are most critical for optimal operation of the system, the electro-optic phase modulator (EOM) modulation depth being identified as a less critical parameter.

Figure 5C:
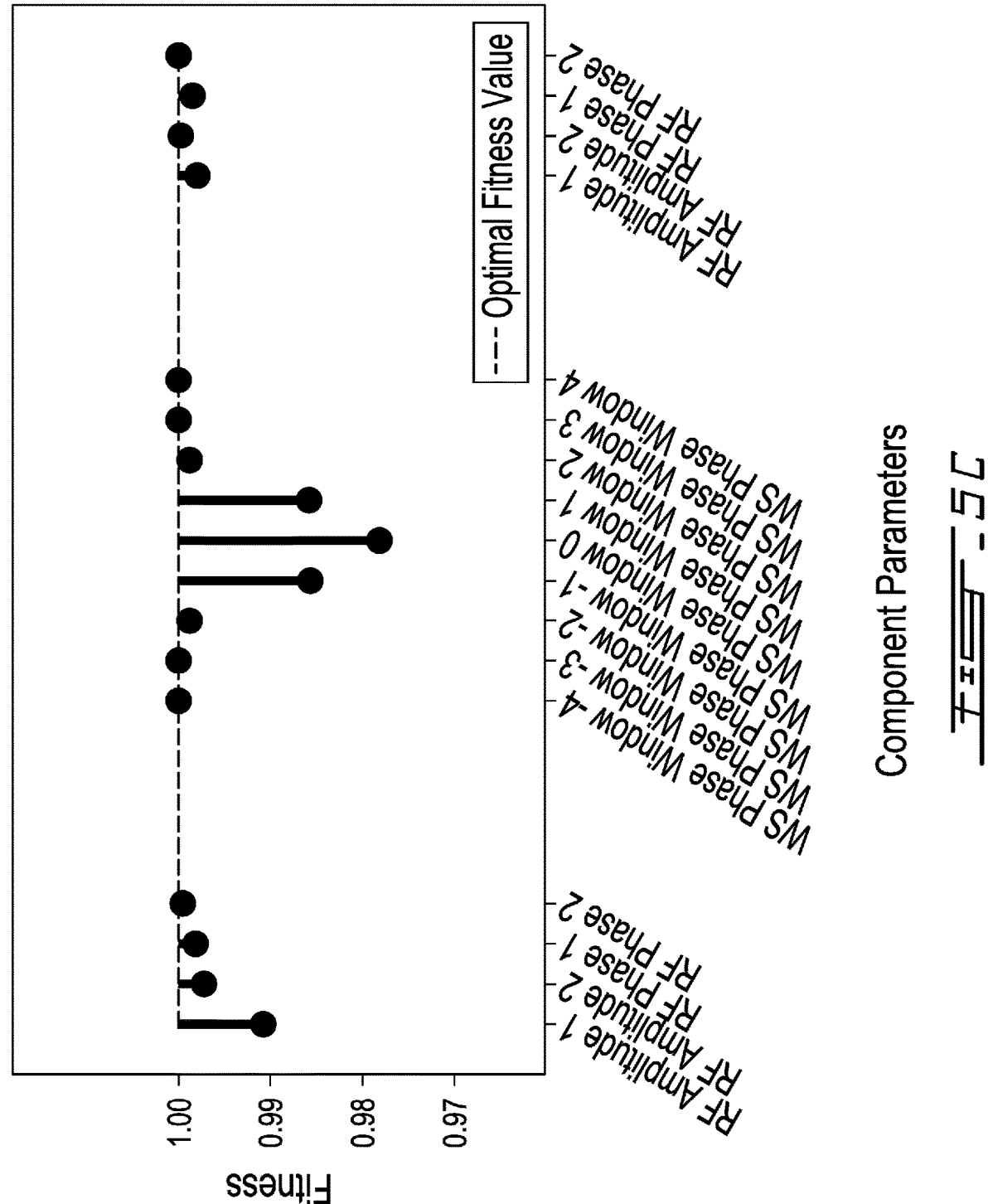
FIG. 5C shows the parameter analysis according to an embodiment of an aspect of the present disclosure.

It was also shown that the automated design method is applicable to the design of quantum optical systems. For example, the method was used to design a quantum gate for frequency-bin quantum states which provides robustness to nonidealities in component parameters (FIG. 5). FIG. 5A is a graph of a candidate system design for a frequency-bin quantum gate, comprising a radio-frequency synthesizer (RF) and single photon detectors (SPD). FIG. 5B shows a comparison of the fitness function, representing the fidelity between the realized operation and a target operation as discussed hereinabove, in a local region around the optimum for two parameters. FIG. 5C shows the parameter analysis of the optimal system, providing insight into which parameters are most critical for optimal operation of the system.

The method thus searches through a variety of possible setups systems and finds the optimal candidate systems using a user-defined specific target, and provides information about the robustness and stability of the overall systems and may even factor these responses into optimal design choice.

There is thus provided a method which searches through a variety of possible setups and outputs optimal candidates using a user-defined specific target, thus expediting and improving optical system design, while considering a full range of potential setups. The method also provides information about the robustness and stability of the overall system and can combine these data into optimal design options.

The method described hereinabove comprises two nested optimization processes, including optimization to find optimal graph topologies, and optimization to find optimal component parameters per topology, and the assessment of fitness function landscape metrics to enhance both the designs and the convergence, hence the speed, of the method. By using computational graphs as explicit representations of systems, the method can draw on methods such as graph-based learning and artificial neural networks to frame optimization. Also, decoupling the two optimization processes allows for a broader exploration of the design space and enhances the likelihood that optimal combinations of system topologies and component parameters are obtained.

There is thus provided a method for photonics system design on the topology level, which takes into account connections between components and component parameters simultaneously for exploring new photonics systems involving multiple simultaneous optical phenomena, such as dispersion, modulation, nonlinearity, interference, etc., operated by individual photonics components combined in a highly specific topology.

The method for optical system design described hereinabove , while optimizing time-consuming trial-and-error methods typically used in the art, allows exploration of completely novel photonics systems and system parameters. As a result of such expansively exploration of the entire parameter space, the method is capable of proposing unintuitive or difficult to conceptualize systems.

The present design method combines physical laws and constraints, desired targets, and components used in photonics systems, which typically involve complications due to the increased number of accessible degrees-of-freedom, including polarization, time, frequency, orbital angular momentum, and photon number for example, larger bandwidths, interference effects, and a large number of components which may influence different degrees-of-freedom.

The fitness landscape analysis provides insight into the components, parameters, and combinations thereof, which most influence the fitness, and which may be used to guide the topology optimization by making links between components which are highly interdependent; guide optimization to solutions which are highly robust or sensitive depending on the application; and provide information about which parameters most impact the target characteristic of the system.

FIGS. 2-5 represent demonstrations of systems obtained by a method according to the present disclosure, each targeting a range of optical technologies and applications. The method makes photonics system design accessible to non-specialists, with the possibility to abstract away much of the design process from the user. The specific selection and combination of steps and sequences proposed herein yield a precise, yet flexible, method to quickly design phonics systems in any optical degree-of-freedom, including for example time-energy, polarization, orbital angular momentum, etc., for use in a range of applications including metrology, material processing, telecommunications, and quantum photonics.

The method and system described herein may be adapted to new targets and new optical degrees-of-freedom, including multiple degrees-of-freedom simultaneously.

The scope of the claims should not be limited by the embodiments set forth in the examples but should be given the broadest interpretation consistent with the description as a whole.

The invention claimed is:

1. A method for producing a photonic system which achieves a target photonic functionality, and programmed as sets of computer instructions performed by using a classical processor, comprising:

receiving (i) an objective function representing the target photonic functionality as described by photonic degrees-of-freedom of the photonic system and relationship of the photonic degrees-of-freedom of the photonic system to parameters of the photonic system, including derivatives thereof, and (ii) a finite database of differentiable, parameterized photonic components of which candidate photonic systems are composed;

performing, on the classical processor, an evolutionary and gradient-based optimization algorithm which iteratively assembles sets of photonic system topologies, optimizes parameters of each individual system topology, identifies and stores combinations of topologies and parameters which achieve respective score on the received objective function, grouping photonic systems into families based on the objective function of the scores and similarity in system topologies; until a stopping criterion is met;

obtaining output data which represents families of photonic system topology and parameters for the candidate photonic systems;

selecting one of the candidate photonic systems;

transmitting, via an instrument-control interface, control instructions to configure a combination of photonic components; generating an optical field through the configured combination; measuring, at a detector, an output corresponding to the objective function; and iteratively updating at least one of the system topology and component parameters until the measured objective function satisfies the target photonic functionality.

2. The method of claim 1, wherein the photonic degrees-of- freedom of the photonic system comprise at least temporal and spectral degrees-of-freedom.

3. The method of claim 1, wherein the stopping criterion is one of a number of iterations and a maximum objective score.

4. The method of claim 1, further comprising performing a robustness analysis by computing and processing the objective function and objective function derivative with respect to system parameters using automatic differentiation.

5. The method of claim 1, performed by at least one of: central processing units and graphics processing units.

6. A system comprising photonic components, a detector and a controller configured to execute the method of claim 1 to configure the system with an output that satisfies the objective function.

7. A system comprising photonic components, a detector and a controller configured to execute the method of claim 1 to configure the system with an output that satisfies the objective function, wherein the photonic components comprise a continuous-wave laser, a radiofrequency synthesizer, an electro-optic phase modulator, a programmable wave shaper, and the objective function measures similarity of a measured electronic waveform to a target waveform.

8. A system comprising photonic components, a detector, and a controller configured to execute the method of claim 1 to configure the system with an output that satisfies the objective function, wherein the objective function measures optical power sensitivity to detuning of a tunable continuous-wave laser frequency through an absorption line, and a robustness analysis maintains the optical power sensitivity above a threshold while limiting degradation from electro-optic modulation depth variation, the system being an optical gas sensor.

9. A system comprising photonic components, a detector, and a controller configured to execute the method of claim 1 to configure the system with an output that satisfies the objective function, wherein the system comprises a radiofrequency synthesizer and single-photon detectors, and the objective function is a gate-fidelity metric between a realized operation and a target frequency-bin unitary; and a robustness analysis constrains fidelity variation in a local parameter neighborhood.

10. The method of claim 1, wherein the system comprises a continuous-wave laser, a radiofrequency synthesizer, an electro-optic phase modulator, a programmable wave shaper and a photodetector, and the objective function measures similarity of a measured electronic waveform to a target waveform.

11. The method of claim 1, wherein the objective function measures optical power sensitivity to detuning of a tunable continuous-wave laser frequency through an absorption line, and a robustness analysis maintains sensitivity above a threshold while limiting degradation from electro-optic modulation depth variations.

12. The method of claim 1, wherein the photonic system comprises a radiofrequency synthesizer and single-photon detectors, and the objective function is a gate-fidelity metric between a realized operation and a target frequency-bin unitary; and the robustness analysis constrains fidelity variation in the local parameter neighborhood.

13. The method of claim 1, comprising enforcing realization constraints comprising at least one constraint on at least one of the individual photonics component; and accepting a configuration only when the measured output meets a tolerance bound on the objective function.

\* \* \* \* \*